United States Patent
Lau et al.

(10) Patent No.: US 8,208,715 B2
(45) Date of Patent: Jun. 26, 2012

(54) TARGET DETECTING, EDITING AND REBUILDING METHOD AND SYSTEM BY 3D IMAGE

(75) Inventors: Chi-Chung Lau, Taipei (TW); Jin-King Liu, Hsinchu (TW); Kuo-Hsin Hsiao, Hsinchu (TW); Ta-Ko Chen, cyong lin Township, Hsinchu County (TW); Jiann-Yeou Rau, Pingjhen (TW); Yi-Chen Shao, Miaoli (TW); Liang-Chien Chen, Pingjhen (TW)

(73) Assignee: Industrial Technology Research Institute, Hsinchu (TW)

( * ) Notice: Subject to any disclaimer, the term of this patent is extended or adjusted under 35 U.S.C. 154(b) by 1156 days.

(21) Appl. No.: 12/038,137

(22) Filed: Feb. 27, 2008

(65) Prior Publication Data

US 2009/0161944 A1    Jun. 25, 2009

(30) Foreign Application Priority Data

Dec. 21, 2007   (TW) ................................ 96149524 A (51) Int. Cl.
| | |
|---|---|
| G06K 9/00 | (2006.01) |
| G06T 15/00 | (2011.01) |
| G01C 3/14 | (2006.01) |
| H04N 13/00 | (2006.01) |
| G02B 27/22 | (2006.01) |
| G03B 35/00 | (2006.01) |

(52) U.S. Cl. ............ 382/154; 345/419; 356/12; 348/42; 359/462; 352/57

(58) Field of Classification Search .................. 382/154; 345/419–427; 356/12–14; 348/42–60; 359/426–477; 352/57–65

See application file for complete search history.

(56) References Cited

U.S. PATENT DOCUMENTS 7,133,551 B2 *  11/2006  Chen et al. .................... 382/154

FOREIGN PATENT DOCUMENTS

JP  2007033157  2/2007

OTHER PUBLICATIONS

Hammar, Quality comparison of automatic 3D city house modeling methods from laser data, School of Architecture and the Built Environment Royal Institute of Technology, Stockholm, Sweden, May 2007.*

Liu et al., "A study on rainfall-induced landslides in Alishan area using airborne LIDAR and digital phorography," Proceedings of ACRS 2007, Nov 12-16, 2007, Kuala Lumpur, Malaysia.*

(Continued)

*Primary Examiner* — Anand Bhatnagar
*Assistant Examiner* — Soo Park
(74) *Attorney, Agent, or Firm* — Allen, Dyer, Doppelt, Milbrath & Gilchrist, P.A.

(57) ABSTRACT

A method and system for target detecting, editing and rebuilding by 3D image is provided, which comprises an inputting and picking unit, a training and detecting unit, a displaying and editing unit and a rebuilding unit. The inputting and picking unit receives a digital image and a LiDAR data and picks up a first parameter to form a 3D image. The training and detecting unit selects a target, picks up a second parameter therefrom, calculates the second parameter to generate a threshold and detects the target areas in the 3D image according to the threshold. The displaying and editing unit sets a quick selecting tool according to the threshold and edits the detecting result. The rebuilding unit sets a buffer area surrounding the target, picks up a third parameter therefrom and calculates the original shape of the target by the Surface Fitting method according to the third parameter.

24 Claims, 6 Drawing Sheets

OTHER PUBLICATIONS

Jan et al., "Modelling forest canopy using airborne LIDAR data", 2006.*
Ma, "DEM generation and building detection from LIDAR data", 2005.*
Ma, "Building model reconstruction from LIDAR data and aerial photographs", 2004.*
Teo et al., "Reconstruction of complex buildings using LIDAR and 2D maps", 2006.*

* cited by examiner

Planar

Bi-linear

Quadratic

Bi-quadratic

Cubic

Bi-cubic

Fig. 6

TARGET DETECTING, EDITING AND REBUILDING METHOD AND SYSTEM BY 3D IMAGE

FIELD OF THE INVENTION

The present invention relates to a target detecting, editing and rebuilding system, and more particular to a target detecting, editing and rebuilding system by 3D image.

BACKGROUND OF THE INVENTION

More than 60% of the areas in Taiwan are referred to the mountain area and the mountainside area, especially, in the mountain area, the shape thereof is steep, the water flows therein are rapid, the structure thereof is complicated, the rock property therein is fragile and the soil therein are soft. Besides, the average rainfall in the mountain area reaches 2,500 millimeter per year, which is the three times of the average rainfall of the whole world. In particular, after the 921 Earthquake in 1999, the shallow layer of the soil becomes loose and every time when the typhoon or the torrential rain comes, it is very easy to trigger the landslide. The direct effect of the landslide is that the soil is scrubbed and glided along the gully, the valley and the river to the downstream area and aggregated in the bottom of the dam that makes the dam's capacity descended, makes the water pollution, makes the domestic water short and economic loss. If the landslide area fails to be recovered quickly, the rain will scrub the surface soil and rock and further descend the capacity and the life of the dam. Therefore, for effectively managing the dam, the forest and the mountainside, recovering the landslide area and providing the preventing and the rescuing support, it is necessary to do the effective and precisely investigation.

The mainly conventional investigation schemes are that 1) sending people to the scene to measure and survey or 2) automatically or manually recognizing the scope of the ground surface change by using the remote sensing data. The scene measurement and survey is the most precise and reliable manner, but it is ineffective, expensive, and easily affected by the terrain, the weather and traffic. The remote measurement technique using the aerial photos and the satellite image have the characters, such as the larger observation scope, the less dead space and the capability to repeatedly observe with the time line, that make the observer quickly obtain the data of the ground surface without the limitation of the sense, time and space. So far, the broadest used remote measurement sources include the aerial photos (stereo-pairs and orthophoto), the optic satellite image (orthophoto image), the synthetic aperture radar (SAR), the ground and the airborne light detection and ranging (LiDAR), and the follows are the discussions of the relevant survey techniques using the remote measurement in the respects of the data and the skills.

Aerial Photos

This technique uses the aerial photographic stereo-pairs and the manual stereo measurement for detecting. Using this technique can obtain the highly precise ground surface change in the small area, but needs lots of the manpower and the time and fails to rapidly and effectively provide the user with the relevant data for helping the survey and estimation of the disaster. According to the references and the experience, the manual detection has six visual criteria including the hue, the location, the shape, the orientation, the slope and the shadow, as showed in Table 1. From the point of view for automatic detection, the appropriateness of the criteria is discussed as follows. Regarding the hue criterion, the possible range is obtained by automatically extracting from the color information of the aerial photos. Regarding the location criterion, the possible sites of the ground surface change is extracted by using other auxiliary data, such as the roads, the mountain ridges and the rivers, to produce the buffer areas for overlaying on the image. Regarding the shape criterion, the data are obtained by using the morphology of the topography, but this part is the hardest part to be detected by the automatic method. Regarding the detection of the orientation, the possible sites of the ground surface change is detected by using the digital elevation model (DEM) to calculate the slope direction and cooperating with the river information. The slope can also be calculated by using the DEM. The shadow is a sensing factor, which is mainly used to detect the rise and fall of the ground surface and hard to be performed by the automatic method. Therefore, in the manual detection process, the 3D image is simulated by using the stereo observation, or by cooperating the orthophoto and the DEM. Accordingly, the detection criteria mentioned above are not so appropriate to be the necessary conditions of the automatic detection.

TABLE 1

| detection criteria | content |
|---|---|
| hue | brown, dark brown, light brown, green-brown |
| location | the ridge around, the river-impacting slope, the road o |
| shape | the bar type, the spoon type, the dendrite stream-assembling site, the triangle or the rectangle in the valley |
| orientation | the gravity direction of the slope and the stream direction are orthogonal |
| slope | the sloping field |
| shadow | the shadow effect is used to tell the valley and the ridge for establishing the 3D image |

The Satellite Image

The technique of determining the landslide by using the satellite ortho-image is similar to that by using the aerial photos, but since the limitation of the space resolution of the satellite image, it more depends on the variation analysis in the different time. After comparing these two techniques, it is found that the result of the landslide automatically detected by using the satellite image is less than that manually determined by using the aerial photos both in numbers and area, thus the automatic detection by using the satellite image is still not good enough for the engineering application. However, since the satellite image has high time resolution and large shooting range that can quickly precede the ground surface survey after the disaster. Furthermore, when doing the ground surface determination by using a single satellite image, because lack of the third dimension information, it should combine with the DEM to establish the stereo-vision simulation to assist the manual determination and editing and that avoids misclassifying landslide from the flat barren land.

The Airborne Light Detection and Ranging (LiDAR)

There were several researches which use the airborne LiDAR to scan the landslide sites made by the 921 Earthquake. After the practically verifying, it is found that the accuracy of the scanning achieves the scale of 12 cm, but there is no discussion about the subjects, the landslide detection and determination, in these reports. Nevertheless, the airborne LiDAR data can be used to obtain the high solution DEM and generate the 3D image, and the 3D image is analyzed by using the 3D analysis method to obtain the roughness of the ground. Furthermore, the ground surface morphology can be analyzed by using the DEM, the 3D image and the roughness. Through the above mentioned geomorphologic analysis, the characters and the mechanism of the landslide can be further understood, and the active landslide can be estimated. Moreover, such high resolution DEM can also be used to analyze the roughness, the slope, the orientation, the semi-variance and the fractal dimension of the ground surface to study the morphology, the components and the activities of the landslide.

In the above study, the DEM with the grid scale of 1.8 meters, the shaded relief map, the slope map, the contour map and the sectional drawings of the topography . . . etc are obtained and established by using the airborne LiDAR with the point cloud density of 1 point per square meter. The mechanism of the ground surface change both in the time scale and the space scale are analyzed through the ground surface morphology and the landslide range is determined by further analyzing the topography. There are around the one-third of LiDAR point cloud that reach the ground under the trees, so the DEM from the LiDAR is more adventure for determining the long term landslide than the DEM from the aerial photos generated by the image matching and the manual editing. However, for the ground surface changing of the exposed soil, the boundary of the range of the ground surface change is drew more precisely by using the aerial photos. Moreover, there is no research using the airborne LiDAR to detect the range of the ground surface change automatically in the relevant references. The fitness for the remote detecting data in the ground surface change investigation Accordingly, the ground surface change investigation methods that are performed by using the remote detecting data mentioned above can be categorized as the table 2 in the fitness. The accuracy portion refers to the position accuracy of the boundary of the change range in the plane coordinate, wherein the size is decided by the space resolution of the data, so the high accuracy can express the decimeter level, the middle accuracy can express the 1 meter level and the low accuracy can express the 10 meters level. The accuracy of the LiDAR image in the elevation detection can reach to centimeter level even the millimeter level, but the accuracy of the LiDAR image in the plane position is lower in contrast, so the position accuracy of the ground surface boundary estimation is low.

Please refer to the table 2, the term "investigation range" is distinguished by the data obtained from the high altitude or the ground surface. The ground surface change of the small area is not defined strictly so far, the current standard is that the long axle of the change site is smaller than 50 meters, and the conventional method defines it by using the area of the three pixels of the SPOT satellite multi-spectrum orthophoto, i.e. around 468.75 m$^2$ (=12.5×12.5×3).

The term "instantaneity" refers to how much time for the complete of investigating disaster range or the ground change states after the disaster happened, i.e. the more time it spends, the lower instantaneity it is, and the weather condition is the most variable factor to affect the instantaneity. Except the weather condition, the satellite image schedule and the data transporting time, the gain of the grounded remote detecting data is not easy to achieve the instantaneity, and the satellite image has higher time resolution than the aerial photos, so the satellite image has higher instantaneity in contrast.

The term "automation level" telling the level of the automation mainly depends on the data property and relates to data procession technology and how much handwork involved. The aerial photographic stereo-pairs needs more handwork and the direct corresponding relationship between the stereo-pairs image and the space-coordinate is lower, so the stereo-pairs has lower automation level. Regarding the ortho-photo and the airborne LiDAR, because the data thereof have already been integrated with the geography coordinate, they can quickly detect the change of the ground surface change through the proper algorithm to reach a level of the automation. However, the high level automation does not mean the high accuracy and the high reliability. Although the subsequent manual determination cannot be avoided, the detecting ability of the algorithm highly reduces the level of the involved handwork.

TABLE 2

| | accuracy | investigation range | small area landslide detecting | instantaneity | automation level |
|---|---|---|---|---|---|
| aerial photographic stereo-pairs | high | large | available | middle | Low |
| aerial photographic ortho image | high | large | available | middle | high |
| SPOT satellite ortho image | low | large | unavailable | high | high |
| SAR satellite image | low | large | unavailable | low | high |
| High resolution satellite ortho image | middle | large | available | high | high |
| airborne LiDAR (manually determined according to the topography) | high | large | available | middle | low |

In order to overcome the drawbacks in the prior art, an improved image processing method and system thereof are provided. The particular design in the present invention not only solves the problems described above, but also is easy to be implemented. Thus, the invention has the utility for the industry.

SUMMARY OF THE INVENTION

In accordance with an aspect of the present invention, an automatic target detecting method using 3D image is provided. The method includes the steps of receiving a digital image and a LiDAR (Light Detection And Ranging) datum and picking a first parameter therefrom; generating a 3D image according to the first parameter; selecting a target in the 3D image and picking a second parameter thereof; calculating the second parameter for generating a threshold of the target; and automatically detecting the 3D image and selecting an area reaching the threshold therein.

According to the automatic 3D target detecting method described above, the first parameter includes at least one of a visible band, a DSM (Digital Surface Model), a DEM (Digital Elevation model) and an OHM (Object Height Model).

According to the automatic 3D target detecting method described above, the second parameter includes at least one of a roughness, a slope, an object height and a visible band.

According to the automatic 3D target detecting method described above, the digital image is one of a digital aerial photo and a digital satellite image.

According to the automatic 3D target detecting method described above, the target is a landslide image.

In accordance with another aspect of the present invention, a 3D image editing method is provided. The method includes steps of receiving a digital image and a LiDAR datum to generate a 3D image; selecting a target in the 3D image and picking a parameter thereof; generating a selecting tool with a dilate searching function according to the parameter; and performing at least one of adding, deleting and editing the target in the 3D image by using the selecting tool.

According to the 3D image editing method described above, the parameter includes at least one of a roughness, a slope, an object height and a visible band.

According to the 3D image editing method described above, the target is a landslide image.

In accordance with a further aspect of the present invention, a 3D image rebuilding method is provided. The method includes steps of receiving a digital image and a LiDAR datum to generate a 3D image; selecting a target in the 3D image; generating a buffer area around the target and picking a parameter thereof; and performing a surface fitting calculation according to the parameter for rebuilding an original state of the target.

According to the 3D image rebuilding method described above, the parameter includes a DEM (Digital Elevation Model) and a boundary vector datum.

According to the 3D image rebuilding method described above, the surface fitting calculation is performed by using a surface function.

According to the 3D image rebuilding method described above, the surface function is selected from a group consisting of a Planar surface function, a Bi-linear surface function, a Quadratic surface function, a Bi-quadratic surface function, a Cubic surface function and a Bi-cubic surface function.

According to the 3D image rebuilding method described above, the digital image is one of a digital aerial photo and a digital satellite image.

According to the 3D image rebuilding method described above, the target is a landslide image In accordance with another aspect of the present invention, a target detecting, editing and rebuilding system by 3D image is provided. The system includes an inputting and acquiring unit receiving a digital image and a LiDAR (Light Detection And Ranging) datum and picking a first parameter therefrom to generate a 3D image; a training and detecting unit connected with the inputting and acquiring unit for selecting a target in the 3D image, picking a second parameter thereof, calculating the second parameter to generate a threshold thereof, detecting the 3D image and selecting an area similar thereto according to the threshold; a displaying and editing unit connected with the training and detecting unit for establishing a selecting tool according to the threshold to perform at least one of adding, deleting and editing the area; and a rebuilding unit connected with the displaying and editing unit for establishing a buffer area around the target, picking a third parameter thereof and performing a surface fitting calculation according to the third parameter to rebuild an original state of the target.

According to the target detecting, editing and rebuilding system described above, the first parameter includes a visible band, a DSM (Digital Surface Model), a DEM (Digital Elevation model) and an OHM (Object Height Model).

According to the target detecting, editing and rebuilding system described above, each of the second and the third parameters includes at least one of a roughness, a slope, an object height and a visible band.

According to the target detecting, editing and rebuilding system described above, the digital image is one of a digital aerial photo and a digital satellite image.

According to the target detecting, editing and rebuilding system described above, the target is a landslide image According to the target detecting, editing and rebuilding system described above, the surface fitting calculation is performed by using a surface function, which is selected from a group consisting of a Planar surface function, a Bi-linear surface function, a Quadratic surface function, a Bi-quadratic surface function, a Cubic surface function and a Bi-cubic surface function.

The above contents and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purposes of illustration and description only; it is not intended to be exhaustive or to be limited to the precise form disclosed.

In the present invention, the sorted airborne LiDAR data are integrated into the color aerial photos to establish the automatic detecting technique through the 3D image simulation method that can raise the efficiency and the accuracy of the large scale investigation. However, during the automatic detecting, the omission and the commission are hardly avoided, so the present invention further develop a manual operation interface for manually determining and editing the result of the automatic detecting.

Figure 1:
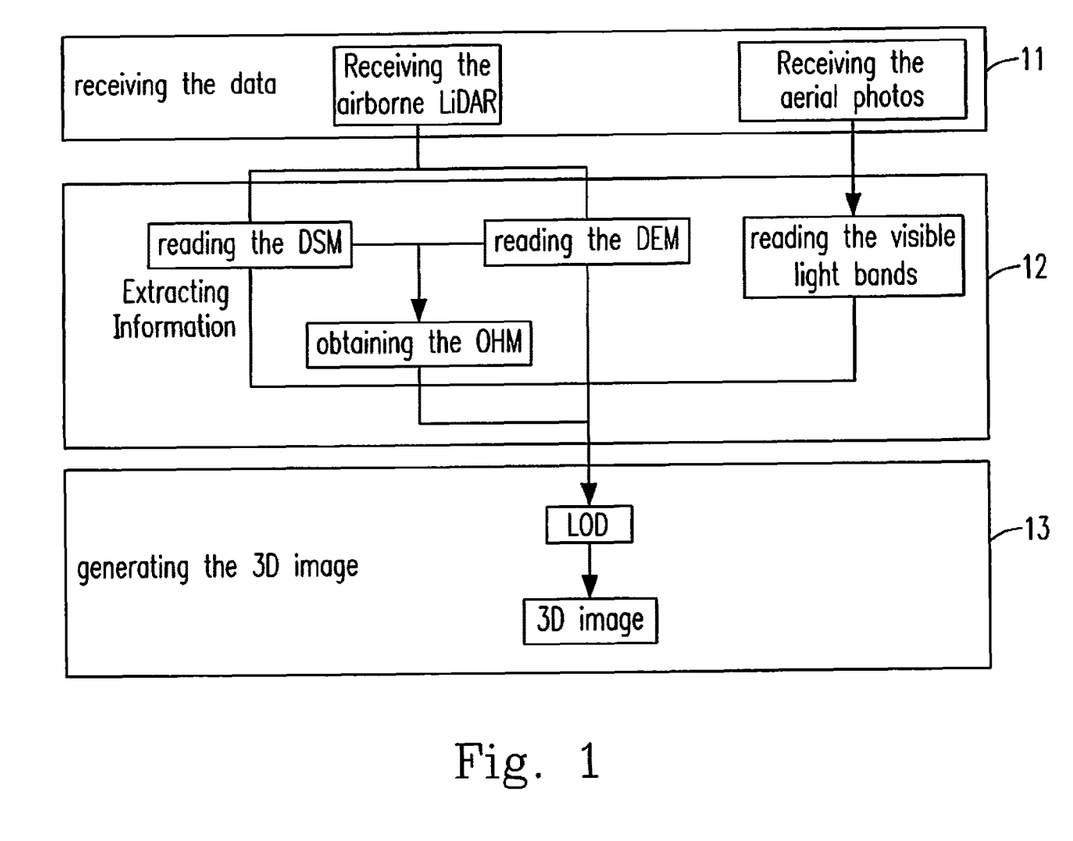
FIG. 1 is a flow chart of the first process of the target detecting, editing and rebuilding system by 3D image, inputting the data and producing the 3D image.

Please refer to FIG. 1, which is the flow chart of the first process of the 3D target detecting, editing and rebuilding system, inputting the data and producing the 3D image. The system receives the digital aerial photos and the airborne LiDAR (Step 11), wherein the digital aerial photos have the data of the ground surface observed from the high altitude and the observation ability thereof has the characters of large range and less dead space. In the routine time or after a disaster, a full-scale investigation for the large interesting area can be performed by using the digital aerial photos. Then, the system picks the data from the digital aerial photos and the airborne LiDAR (Step 12). In this step, the spectrum analysis is used to analyze the ground surface covers. The differences of the visible light band are used to define the boundary of the ground surface covers. The three dimensional space data extraction is used to pick the highly dense and the highly precise three dimensional point cloud data from the airborne LiDAR data. The Climbing-And-Sliding algorithm (CAS) is used to automatically classify the three dimensional point cloud data into the ground surface and the topography. The interpolation is used to form the digital surface model (DSM) and the digital elevation model (DEM) with the 1 meter grid scale, and the differences therebetween are calculated as the object height model (OHM) provided for the roughness analysis of the ground surface, the slope calculation of the topography and the space data of the objects in the third axle, i.e. the height change.

Finally, the system composes the triangulated regular network (TRN) with the DSM, the DEM and the OHM for forming the level-of-detail (LoD) geometry structure, which is used to generate the real-time dynamic 3D image (Step 13). In the real-time dynamic 3D image, the proper detail of the triangulated regular network can be chosen to increase or decrease the number of the triangulated regular network according to the distance between the object and the observer in order to achieve the real-time dynamic displaying.

Figure 2:
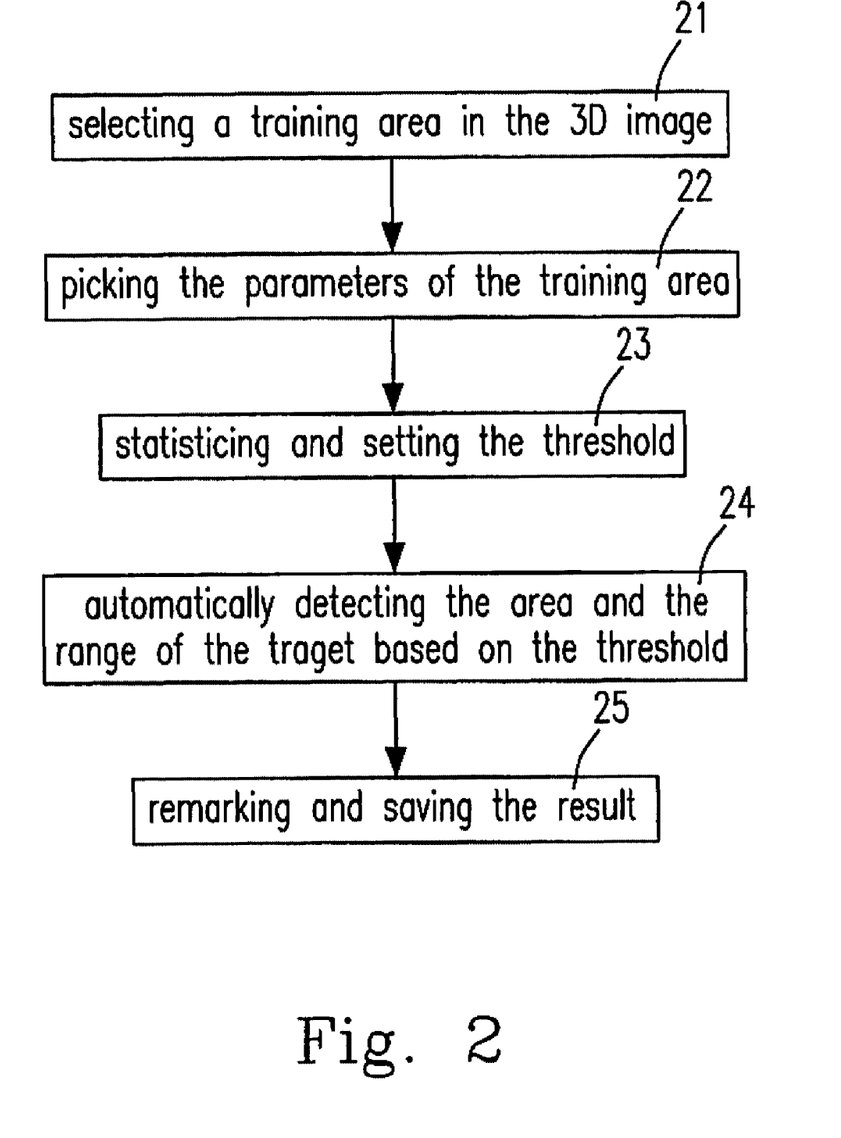
FIG. 2 is a flow chart of the second process of the target detecting, editing and rebuilding system by 3D image, training for detecting the target and detecting the target automatically.

Please refer to FIG. 2, which is the flow chart of the second process of the 3D target detecting, editing and rebuilding system, training for detecting the target and detecting the target automatically. In the first step, a target in the 3D image produced in the first process is selected to be a training area (Step 21). Then, the parameters of the training area including the roughness, the slope, the object height and the visible bands are picked (Step 22). The system statistically calculates the mean and the standard deviation of these parameters, wherein the mean is added or subtracted by times of the standard deviation to be the threshold (Step 23). According to the threshold, the system processes the full-scale fast search to search the positions and the ranges of the image area reaching the threshold in the 3D image by the probability determination through the Boolean logic operation (Step 24). At last, the system remarks the detecting results and saves them (Step 25).

Figure 3:
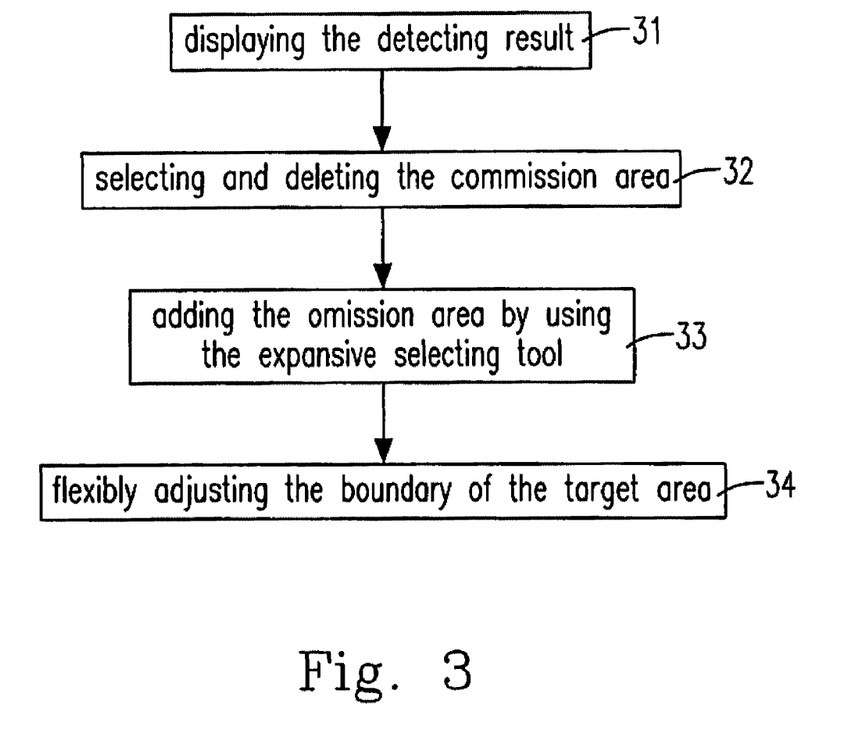
FIG. 3 is a flow chart of the third process of the target detecting, editing and rebuilding system by 3D image, editing the detecting result.
Figure 5:
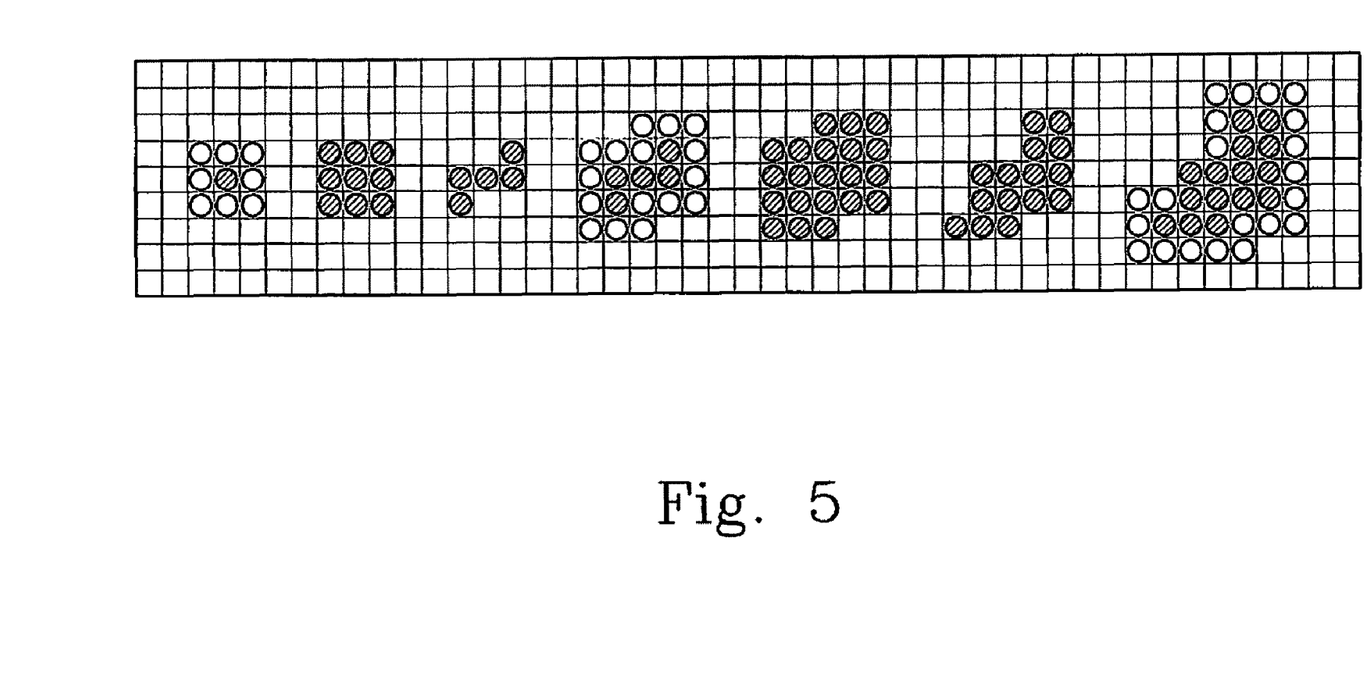
FIG. 5 is a diagram showing the selecting method of the selecting tool with the expansive searching function for editing the 3D image.

Please refer to FIG. 3, which is the flow chart of the third process of the 3D target detecting, editing and rebuilding system, editing the detecting result. First, the system displays the detecting results performed in the second process (Step 31). The system has a function to manually add, delete or edit the boundary for modifying the omission and the commission of the detecting result. In this function, the user can use not only the general image editing tools to select and delete the commission area (Step 32) and flexibly adjust the boundary of the selected area (Step 34), but also an expansive searching tool like the magic wand tool in the Photoshop, which can select an area by picking up an interesting point and the dilate searching tool will expand the area from the interesting point to the area boundary as showed in FIG. 5. The principle of the dilate searching is that the user selects an interesting point as the center and the system gathers the four parameters, the roughness, the slope, the object height and the visible light band, of the 5×5 grids (25 quadrant grids) surrounding with the center, calculates the mean and the standard deviation of the four parameters, wherein the mean is added or subtracted by the three-folds standard deviation to be the threshold and continuously dilate searches the same property grids toward the eight outward orientations until no the same property grid is found. Besides, it can use the statistic value of the parameters of the training area in the second process instead of that here. The user can use the dilate searching tool to quickly add the large areas for the omission of the detecting result (Step 33). When the editing is completed, the system saves the editing result.

Figure 4:
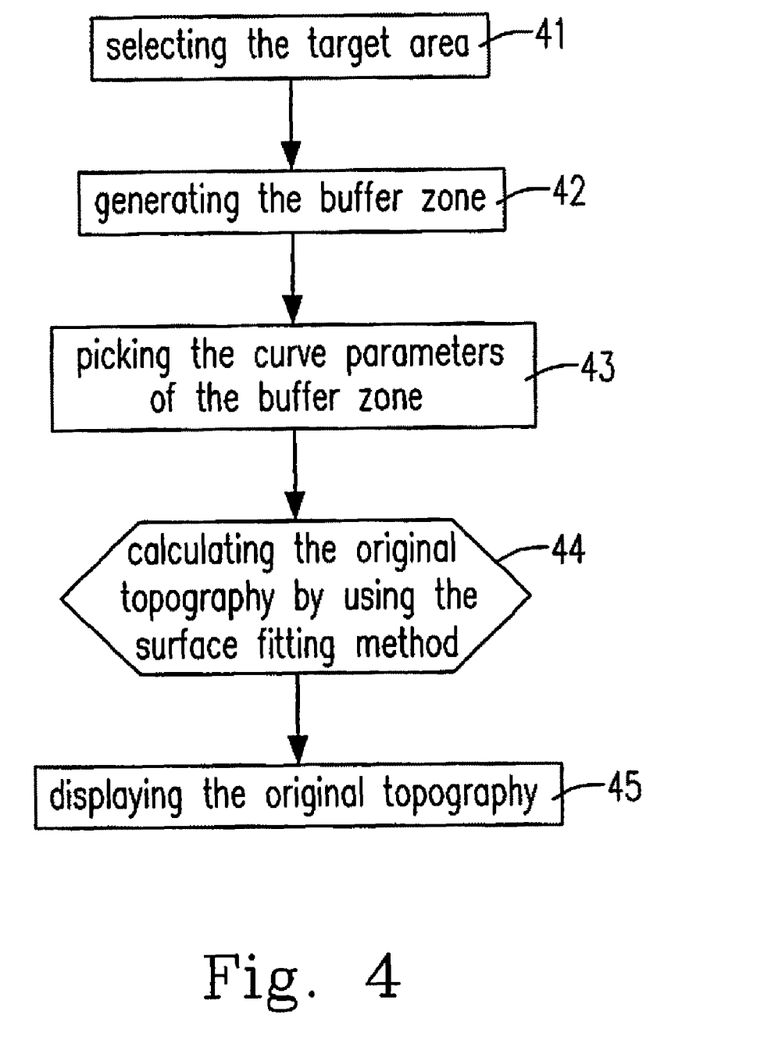
FIG. 4 is a flow chart of the fourth process of the target detecting, editing and rebuilding system by 3D image, rebuilding the original target.

Please refer to FIG. 4, which is the flow chart of the fourth process of the 3D target detecting, editing and rebuilding system, rebuilding the original target. The user selects a target area in the 3D image (Step 41), which has different shape among the areas surrounding with the target area. The system automatically generates the buffer zone surrounding with the target area by using the block growing method (Step 42) and estimates the original shape of the target area by using the surface fitting method. It is assumed that the shape of the target area can be described through the surface functions ($z=f(x,y)$) by using the DEM and the ground boundary vector, so the system picks the DEM data of the buffer zone as the reference and calculates by the least squares to obtain the respective coefficients for the surface functions (Step 43). Finally, the system uses the coefficients in the surface functions to calculate the original shape of the target area (Step 44), and then shows it in the 3D image (Step 45).

It is important to decide the size of the buffer zone, i.e. the representability to the fitted topographic surface by the ratio of the reference and the target area. The present invention decides the size of the buffer zone according to a multiple of the target area, for example the 0.5 times, 1 time or 2 times of the target area. The multiple can be decided by the user. In the present invention, the general topography is used to simulate the target area before change to study how to choose the proper surface function and decide the proper buffer zone size for the different variations.

Figure 6:
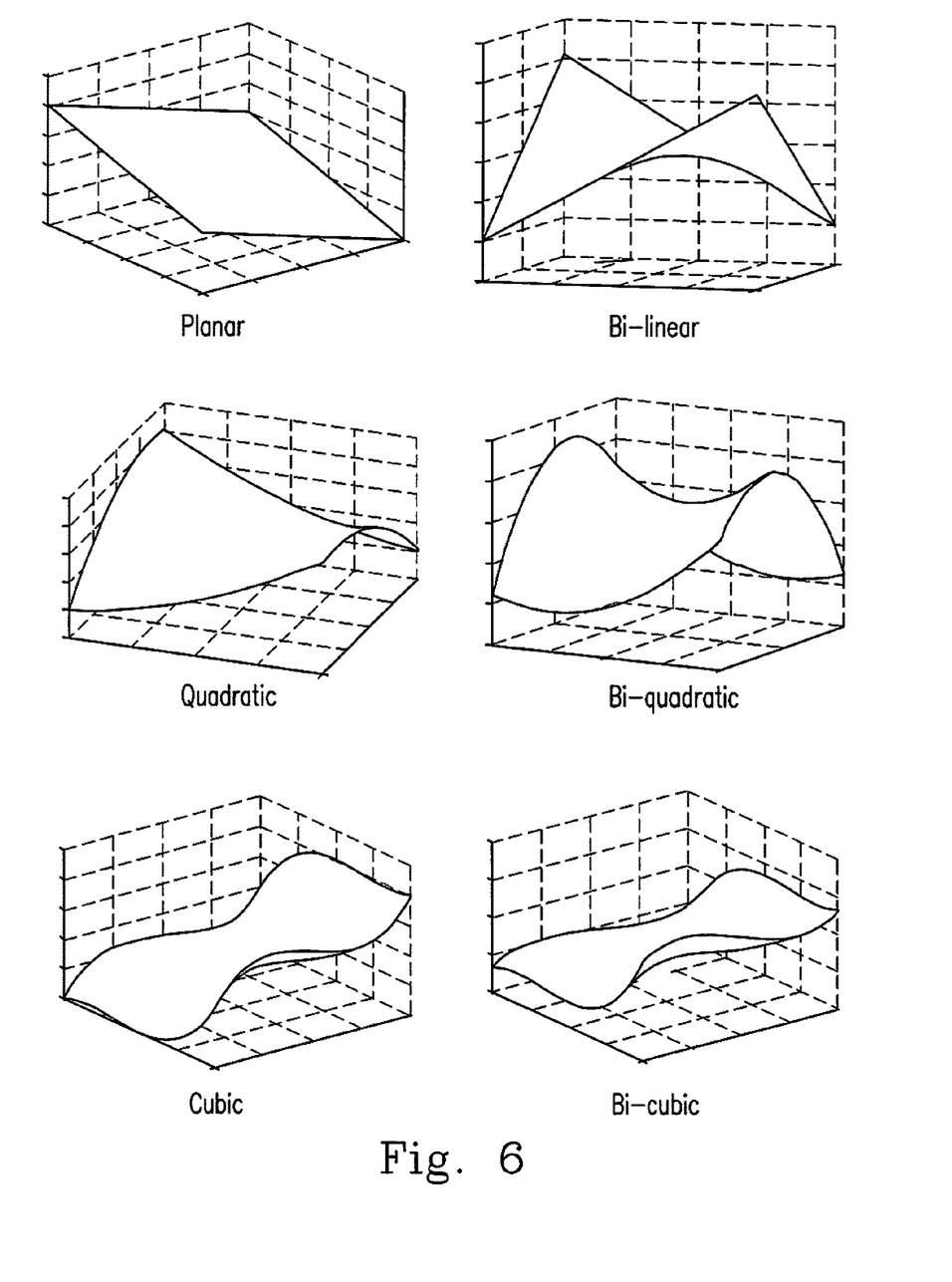
FIG. 6 is an example of the surface functions for the 3D image rebuilding system.

In the present invention, the surface functions are tested by using the multinomial functions. The table 3 shows the coefficients used in the six surface functions in the present invention including the Planar function, the Bi-linear function, the Quadratic function, the Bi-quadratic function, the Cubic function and the Bi-cubic function. Besides, the powers of the multinomial functions are from the first to the third, and FIG. 6 shows the sample surfaces of the six surface functions.

TABLE 3

| | 1 | x | y | xy | $x^2$ | $y^2$ | $x^2y$ | $xy^2$ | $x^2y^2$ | $x^3$ | $y^3$ | $x^3y$ | $xy^3$ | $x^3y^2$ | $x^2y^3$ | $x^3y^3$ |
|---|---|---|---|---|---|---|---|---|---|---|---|---|---|---|---|---|
| Planar | V | V | V | | | | | | | | | | | | | |
| Bi-linear | V | V | V | V | | | | | | | | | | | | |
| Quadratic | V | V | V | V | V | V | | | | | | | | | | |
| Bi-quadratic | V | V | V | V | V | V | V | V | V | | | | | | | |
| Cubic | V | V | V | V | V | V | V | V | | V | V | | | | | |
| Bi-cubic | V | V | V | V | V | V | V | V | V | V | V | V | V | V | V | V |

The present invention, 3D target detecting, editing and rebuilding system, has the capability for monitoring the ground surface in the large scale or the full-scale. The monitor object includes the landslide and the forest group . . . etc. When monitoring the landslide, the system obtains the data of the DSM, the DEM, the OHM and the visible bands from the airborne LiDAR and the digital aerial photos, and draws the 3D map by using them. In Taiwan, the usual landslide conditions include the phenomena of the soil exposing, the dense trees-surrounding and the steep shape, wherein the soil exposing causes the roughness decreasing, the steep shape causes the large slope and the dense trees-surrounding causes the strong contrast of the green color. Since the user has selected a landslide area in the 3D map to be a training area, the system automatically analyzes and statistics the mean and the standard deviation of the parameters including the roughness, the slope, the object height and the visible light band (the green level) to set up the detecting threshold. Then, the system uses the probability determination and the Boolean logic operation to process the full-scale automatic detection in the 3D image on the basis of the parameters' threshold and marks the detected area for recording the landslide conditions. In the next step, the user uses the editing tool in the present system to manually edit the results from the automatic detection by adding or deleting the detected area and flexibly adjusting the boundary of the detected area for increasing the accuracy of the detection. At the last, the system generates the buffer zone around the landslide area, picks the DEM thereof to be the reference and estimates the original topography of the landslide area by using the surface fitting with the reference. Finally, the system calculates the amount of the flowing or accumulated soil in the landslide area by subtracting the landslide area from the estimating original topography, so that the system can estimate the conditions of the downstream area affected by the flowing soil from the landslide area, for example the silted of the dam.

In the forest group monitoring, since the different trees have different chlorophyll concentrations and patterns, the detection emphasizes the difference of the visible bands to quickly investigate the distribution of the different groups. The investigating results can also be manually edited and automatically rebuilt. Like the flowing soil estimation, the rebuilding result can also be used to estimate the amount of the different woods. Finally, the investigation data can be used to estimate the forest resource or the wood resource, and which combining to the topography property data like the slope and the object height, can be used to plan the land development.

Accordingly, the present invention, the target detecting, editing and rebuilding system by 3D image can quickly and precisely determine whether the ground surface change is happened and estimate the effects and the seriousness of the disasters, such as landslide. Furthermore, the present invention has the better ability to immediately detect and warn against the effects caused by the disasters as the earthquake, the typhoon and the heavy rain.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An automatic 3D target detecting method, comprising steps of:
   receiving a digital image and a LiDAR (Light Detection And Ranging) datum and picking a first parameter therefrom;
   generating a 3D image according to the first parameter;
   selecting a target in the 3D image and picking a second parameter thereof;
   calculating the second parameter for generating a first threshold of the target;
   automatically detecting the 3D image and selecting an area meeting the first threshold therein; and
   generating a selecting tool having a dilation searching function according to at least one of the first parameter and the second parameter, wherein the dilation searching function comprises steps of
   selecting rid from the area as an interesting point,
   collecting a plurality of third parameters of a first group of grids being around the interesting point,
   calculating a standard deviation of the third parameters,
   determining a specific multiple of the standard deviation to define a second threshold,
   selecting a first added grid meeting the second threshold from the first group of grids, and
   searching a second group of grids for selecting a second added grid meeting a third threshold, wherein the second group of grids surround the first added grid.

2. An automatic 3D target detecting method in claim 1, wherein the first parameter includes at least one of a visible band, a DSM (Digital Surface Model), a DEM (Digital Elevation model) and an OHM (Object Height Model).

3. An automatic 3D target detecting method as claimed in claim 2, wherein the second parameter includes at least one of a roughness, a slope, an object height and a visible band.

4. An automatic 3D target detecting method as claimed in claim 1, wherein the digital image is one of a digital aerial photo and a digital satellite image.

5. An automatic 3D target detecting method as claimed in claim 1, wherein the target is a landslide image.

6. An automatic 3D target detecting method as claimed in claim 1, wherein the specific multiple is three times, the first added grid is located at one of eight grids completely and directly surrounding the interesting point, and the first group of grids include 25 grids.

7. A 3D image editing method, comprising steps of:
   receiving a digital image and a LiDAR datum to generate a 3D image;
   selecting a target in the 3D image and picking a first parameter thereof;
   automatically detecting the 3D image and selecting an area according to first the parameter;
   generating a selecting tool with a dilation searching function according to the first parameter, wherein the dilation searching function comprises steps of:
   selecting a grid from the area as an interesting point,
   collecting a plurality of second parameters of a first group of grids being around the interesting point,
   calculating a standard deviation of the second parameters,
   determining a specific multiple of the standard deviation to define a first threshold,
   selecting first added grid meeting the first threshold from the first group of grids, and
   searching a second group of grids for selecting a second added grid meeting a second threshold, wherein the second group of grids surround the first added grid; and
   performing at least one of searching, adding, deleting and editing the target in the 3D image by using the selecting tool.

8. A 3D image editing method as claimed in claim 7, wherein the first parameter includes at least one of a roughness, a slope, an object height and a visible band.

9. A 3D image editing method as claimed in claim 7, wherein the target is a landslide image.

10. A 3D image editing method as claimed in claim 7, wherein the specific multiple is three times, the first added grid is located at one of eight grids completely and directly surrounding the interesting point, and the first group of grids include 25 grids.

11. A 3D image rebuilding method, comprising steps of:
receiving a digital image and a LiDAR datum to generate a 3D image;
selecting a target in the 3D image;
automatically detecting the 3D image and selecting an area according to the target;
generating a buffer area around the target with a dilation searching function and picking a parameter thereof, wherein the dilation searching function comprises steps of:
selecting a grid from the area as an interesting point;
collecting plurality of parameters of a first group of grids being around the interesting point;
calculating a standard deviation of the parameters;
determining a specific multiple of the standard deviation to define a first threshold;
selecting a first added grid meeting the first threshold from the first group of grids; and
searching a second group of grids for selecting a second added grid meeting a second threshold, wherein the second group of grids surround the first added grid; and
performing a surface fitting calculation according to the parameter for rebuilding an original state of the target.

12. A 3D image rebuilding method as claimed in claim 11, wherein the parameter includes a DEM (Digital Elevation Model) and a boundary vector datum.

13. A 3D image rebuilding method as claimed in claim 11, wherein the surface fitting calculation is performed by using a surface function.

14. A 3D image rebuilding method as claimed in claim 13, wherein the surface function is selected from a group consisting of a Planar surface function, a Bi-linear surface function, a Quadratic surface function, a Bi-quadratic surface function, a Cubic surface function and a Bi-cubic surface function.

15. A 3D image rebuilding method as claimed in claim 11, wherein the digital image is one of a digital aerial photo and a digital satellite image.

16. A 3D image rebuilding method as claimed in claim 11, wherein the target is a landslide image.

17. A 3D image rebuilding method as claimed in claim 11, wherein the specific multiple is three times, the first added grid is located at one of eight grids completely and directly surrounding the interesting point, and the first group of grids include 25 grids.

18. A target detecting, editing and rebuilding system by 3D image, comprising:
an inputting and acquiring unit receiving a digital image and a LiDAR (Light Detection And Ranging) datum and picking a first parameter therefrom to generate a 3D image;
a training and detecting unit connected with the inputting and acquiring unit for selecting a target in the 3D image, picking a second parameter thereof, calculating the second parameter to generate a first threshold thereof, detecting the 3D image and selecting an area similar thereto according to the first threshold;
a displaying and editing unit connected with the training and detecting unit for establishing a selecting tool having a dilation searching function according to a second threshold to perform at least one of searching, adding, deleting and editing the area, wherein the dilation searching function comprises steps of:
selecting a grid from the area as an interesting point;
collecting a plurality of third parameters of a first group of grids being around the interesting point;
calculating a standard deviation of the third parameters;
determining a specific multiple of the standard deviation to define the second threshold;
selecting a first added grid meeting the second threshold from the first group of grids; and
searching a second group of grids for selecting a second added grid meeting a third threshold, wherein the second group of grids surround the first added grid; and
a rebuilding unit connected with the displaying and editing unit for establishing a buffer area around the target, picking a fourth parameter thereof and performing a surface fitting calculation according to the fourth parameter to rebuild an original state of the target.

19. A target detecting, editing and rebuilding system as claimed in claim 18, wherein the first parameter includes a visible light frequency band, a DSM (Digital Surface Model), a DEM (Digital Elevation model) and an OHM (Object Height Model).

20. A target detecting, editing and rebuilding system as claimed in claim 18, wherein each of the second and the fourth parameters includes at least one of a roughness, a slope, an object height and a visible band.

21. A target detecting, editing and rebuilding system as claimed in claim 18, wherein the digital image is one of a digital aerial photo and a digital satellite image.

22. A target detecting, editing and rebuilding system as claimed in claim 18, wherein the target is a landslide image.

23. A target detecting, editing and rebuilding system as claimed in claim 18, wherein the surface fitting calculation is performed by using a surface function, which is selected from a group consisting of a Planar surface function, a Bi-linear surface function, a Quadratic surface function, a Bi-quadratic surface function, a Cubic surface function and a Bi-cubic surface function.

24. A target detecting, editing, and rebuilding method as claimed in claim 18, wherein the specific multiple is three times, the first added grid is located at one of eight grids completely and directly surrounding the interesting point, and the first group of grids include 25 grids.

* * * * *